United States Patent Office 3,345,369
Patented Oct. 3, 1967

3,345,369
NOVEL SUBSTITUTED 7-ACETYLAMINO CEPHALOSPORANIC ACIDS
Martin Leon Sassiver, Pearl River, and Benjamin Arthur Lewis, Suffern, N.Y., and Robert Gordon Shepherd, Ridgewood, N.J., assignors to American Cyanamid Company, Stamford, Conn., a corporation of Maine
No Drawing. Filed Feb. 15, 1967, Ser. No. 616,178
10 Claims. (Cl. 260—243)

ABSTRACT OF THE DISCLOSURE

This disclosure describes compounds of the class of 7-(azialkanoylamino)cephalosporanic acids, 7-[(α-phenyl)azialkanoylamino]cephalosporanic acids, 7-[(ω-carboxy)azialkanoylamino]cephalosporanic acids and 7-[(α - phenyl - ω - carboxyl)azialkanoylamino]cephalosporanic acids; useful as anti-bacterial agents.

---

This invention relates to new derivatives of 7-aminocephalosporanic acid and, more particularly, is concerned with novel compounds which may be represented by the following general formula:

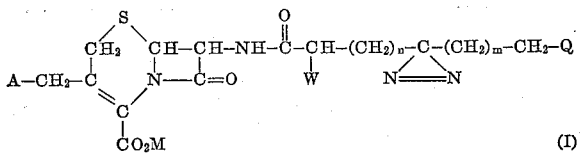

wherein $m$ has a value of 0, 1 or 2; $n$ has a value of 0, 1 or 2; A is acetoxy or N-pyridinium; M is hydrogen, pharmaceutically acceptable nontoxic cations or an anionic charge when A is N-pyridinium; Q is hydrogen or carboxy; and W is hydrogen or phenyl with the proviso that when W is phenyl then $n$ must not be 0.

DETAILED DESCRIPTION OF THE INVENTION

In general Formula I set forth above, suitable azialkanoyl groups contemplated by the present invention may be, for example, 3-azibutanoyl, 4-azipentanoyl, 4-azi-2-phenylpentanoyl, 5 - azihexanoyl, 4-azi-6-carboxyhexanoyl, 5-azioctanoyl, 5-azi-8-carboxyoctanoyl, 5-azi-2-phenyloctanoyl, 5-azi-2-phenyl-8-carboxyoctanoyl, and the like. In those instances where A is N-pyridinium, the cationic charge on this group is matched by the anionic charge of the carboxylic acid radical, the entire molecule being of a zwitterion nature and $m$ is thus an anionic charge.

Also embraced within the scope of the present invention are the nontoxic, pharmaceutically acceptable salts of these derivatives of 7-aminocephalosporanic acid. Included are the monobasic salts when Q is hydrogen and the dibasic salts when Q is carboxy. The cations comprised in these salts and embraced by M include, for example, the nontoxic metal cations such as the sodium ion, potassium ion, calcium ion, magnesium ion as well as the organic amine cations, such as the tri(lower alkyl) amine cations (e.g., triethylamine), procaine, and the like.

The novel compounds of the present invention, when A is acetoxy in Formula I above, may be readily prepared by acylating 7-aminocephalosphoranic acid with a compound of the formula:

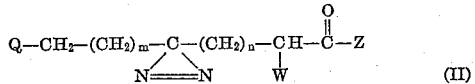

wherein $m$, $n$, Q and W are as hereinbefore defined and Z is a halide (preferably chloride), azide, acyloxy or p-nitrophenoxy group. This acylation of the 7-aminocephalosporanic acid is performed, for example, by the Schotten-Baumann method, taking into consideration the sensitivity of these compounds, under mild conditions and advantageously in the presence of a diluent or solvent such as water or an organic solvent, for example, a ketone such as acetone, an ether such as tetrahydrofuran, or a halogenated hydrocarbon such as chloroform or methylene chloride. The reaction is preferably conducted in the presence of a basic agent such as sodium bicarbonate or potassium bicarbonate, or an organic base such as one of the organic bases listed hereinbefore. The reaction is also preferably carried out at a temperature of from about 0° C. to about 25° C., preferably at 0° C–5° C., and over a period of time of a few hours or more. Where Q is carboxy, the diacid halide, azide or ester is condensed with 7-aminocephalosporanic acid under conditions to give monoacylation and then hydrolyzed during the work-up and separation of isomers to give the desired product. The removal of other isomers, when formed in appreciable amounts, may be readily carried out by chromatographic or crystallization procedures.

The acylating agents corresponding to Formula II, when new, may be prepared by methods well-known in the art from the corresponding acids (Z is hydroxy). Thus, the acid can be treated with thionyl chloride or oxalyl chloride, if desired, in the presence of dimethylformamide, to yield the corresponding acyl chlorides (Z is chlorine), which, if desired, can be converted to the acyl azides (Z is $N_3$) by treatment with sodium azide. The p-nitrophenyl esters (Z is p-nitrophenoxy) can be prepared by following the procedure of Bodanszky et al. (Biochemical Preparations, vol. 9, p. 110, 1962, John Wiley and Sons, New York, N.Y.). Specific acylating agents operable in this process (where Q is hydrogen) include, for example, 3-azibutanoyl chloride, 4-azipentanoyl azide, 4-azi-2-phenylpentanoyl bromide, p-nitrophenyl 5-azihexanoate, 5-azioctanoyl bromide, 5-azi-2-phenyloctanoyl chloride, and the like. Specific acylating agents operable in this process (where Q is carboxy) include, for example, 4-azi-6-carboxyhexanoic acid di-p-nitrophenyl ester, 5-azi-8-carboxyoctanoic acid diazide, 5-azi-2-phenyl-8-carboxyoctanoic acid diacid chloride, and the like. The intermediate azialkanoic acids (Z is hydroxy) corresponding to Formula II above may be prepared from the corresponding ketoalkanoic acids by treatment with hydroxylamine-O-sulfonic acid after conversion of the ketoalkanoic acid to the imine with liquid amonia.

The novel compounds of the present invention, when A is N-pyridinium in Formula I above, may be readily prepared from the corresponding 7-aminocephalosporanic acid derivatives (A is acetoxy in Formula I above) by treatment with pyridine in water or aqueous acetone at 20°–50° C. and for a period of time of about 1–3 days. The resulting 3-(1-pyridylmethyl)-3-cephem-4-carboxylic acid betaines may then be isolated by standard procedures of precipitation and crystallization.

Depending on the reaction conditions used, the new compounds of the present invention are obtained in the free form or in the form of their salts. From the salts it is possible to prepare the acids in known manner, or from the acids the salts are readily accessible, for example, by reaction with hydroxides, carbonates or bicarbonates of alkali metals or alkaline earth metals, or with organic amines.

The novel compounds of the present invention are biologically active and have been found to possess antibacterial activity. As indicated, they are useful antimicrobial agents and have high antimicrobial activity in vitro against standard laboratory microorganisms used to screen for activity against pathogens. The antibacterial spectrum of typical compounds of the present invention, representing the concentration required to inhibit the growth of various typical bacteria, was determined in a standard manner by the agar-dilution streak-plate technique which is commonly used in testing new antibiotics. The following table summarizes the in vitro activity of 7-(4-azipentanoylamino)cephalosporanic acid (1), 7-(3-azibutanoylamino)cephalosporanic acid (2), 7-(5-azihexanoylamino)cephalosporanic acid (3), 7-(4-azi-2-phenylpentanoylamino)cephalosporanic acid (4) and 7-(4-azi-6-carboxyhexanoylamino)cephalosporanic acid (5) as compared with Cephalosporin C (6) against a variety of disease-causing microorganisms.

| Organisms | Minimal inhibitory conc. (mcg./ml.) | | | | | |
|---|---|---|---|---|---|---|
| | (1) | (2) | (3) | (4) | (5) | (6) |
| Staphylococcus aureus No. 11 | 1.56 | 6.25 | 3.12 | 1.56 | 6.25 | 100 |
| Staphylococcus aureus ATCC 13709 | 0.78 | 1.56 | 0.39 | 0.78 | 3.12 | 50 |
| Streptococcus pyogenes C-203 | 0.78 | 0.78 | 0.2 | 0.39 | 3.12 | 25 |
| Bacillus cereus ATCC 10702 | 6.25 | 3.12 | 1.56 | 25 | 25 | 100 |

The compounds of the present invention retained antibacterial activity after exposure to cephalosporinase, a bacterial enzyme, which completely destroyed the activity of Cephalosporin C under the same conditions.

The high in vitro antibacterial activity of the novel compounds of the present invention makes them useful as additives to materials which are subject to microbial deterioration such as cutting oils and fuel oils. They are also useful in soaps, shampoos and topical compositions for the treatment of wounds and burns.

The invention will be described in greater detail in conjunction with the following specific examples.

Example 1.—Preparation of 7-(4-azipentanoylamino)-cephalosporanic acid

The acid chloride of 4-azipentanoic acid is prepared by reacting 256 mg. (2 mmole) of the acid with excess oxalyl chloride and vacuum-evaporating the excess oxalyl chloride. The acid chloride residue is dissolved in 5 ml. of acetone and added dropwise to a stirred, ice-cooled solution prepared by dissolving 548 mg. (2 mmole) of 7-aminocephalosporanic acid and 550 mg. (6.6 mmole) of sodium bicarbonate in 30 ml. of water and 24 ml. of acetone. The reaction mixture is stirred for 2 hours in an ice bath. The acetone is vacuum-evaporated and the residual aqueous solution acidified to pH 2 with hydrochloric acid. The solution is extracted three times with 25 milliliters each time of ethyl acetate which is then dried over magnesium sulfate. Evaporation gives 480 mg. of 7-(4-azipentanoylamino)cephalosporanic acid. The sodium salt is obtained by slurrying this product in 10 ml. of water and adding dilute sodium hydroxide dropwise to pH 5 to effect solution. Vacuum-evaporation to a small volume and addition of a large quantity of acetone precipitates 440 mg. of sodium 7-(4-azipentanoylamino)cephalosporanate as a white solid.

Example 2.—Preparation of 7-(3-azibutanoylamino)-cephalosporanic acid

By replacing the 4-azipentanoyl chloride employed in Example 1 with an equimolecular quantity of 3-azibutanoyl chloride and following substantially the same procedure described in Example 1, there is obtained the 7-(3-azibutanoylamino)cephalosporanic acid.

Example 3.—Preparation of 7-(3-azipentanoylamino)-cephalosporanic acid

The procedure of Example 1 is repeated, substituting an equimolecular amount of 3-azipentanoyl bromide for the 4-azipentanoyl chloride employed in that example. There is thus obtained the 7-(3-azipentanoylamino) cephalosporanic acid.

Example 4.—Preparation of 7-(5-azihexanoylamino)-cephalosporanic acid

In place of the 4-azipentanoyl chloride of Example 1, there is employed an equimolecular quantity of 5-azihexanoyl azide whereby the 7-(5-azihexanoylamino)cephalosporanic acid is obtained in equally good yield.

Example 5.—Preparation of 7-(4-azihexanoylamino)-cephalosporanic acid

In the manner described in Example 1, treatment of 7-aminocephalosporanic acid with p-nitrophenyl 4-azihexanoate produces the 7-(4-azihhexanoylamino)cephalosporanic acid.

Example 6.—Preparation of 7-(4-azi-2-phenylpentanoylamino)cephalosporanic acid

By replacing the 4-azipentanoyl chloride employed in Example 1 with an equimolecular quantity of 4-azi-2-phenylpentanoyl chloride and following substantially the same procedure described in Example 1, there is obtained the 7 - (4 - azi - 2-phenylpentanoylamino)cephalosporanic acid.

Example 7.—Preparation of 7-(4-azi-6-carboxyhexanoylamino)cephalosporanic acid

The procedure of Example 1 is repeated, substituting an equimolecular amount of 4-azipimelic acid dichloride for the 4-azipentanoyl chloride employed in that example. There is thus obtained the 7-(4-azi-6-carboxylhexanoylamino)cephalosporanic acid.

Example 8.—Preparation of 7-(4-azipentanoylamino)-3-(1-pyridylmethyl)-3-cephem-4-carboxylic acid betaine One gram of the sodium salt of 7-(4-azipentanoylamino)-cephalosporanic acid and 8 ml. of pyridine was dissolved in 50 ml. of water, which was adjusted to pH 6 with acetic acid, and stored under nitrogen for 3 days at 37° C. The solution was evaporated to dryness and the residue was triturated with acetone to give 230 mg. of the product.

Example 9.—Preparation of 7-(4-aziheptanoylamino)-3-(1-pyridylmethyl)-3-cephem-4-carboxylic acid betaine One gram of the sodium salt of 7-(4-aziheptanoylamino)cephalosporanic acid and 8 ml. of pyridine was dissolved in 50 ml. of water, which was adjusted to pH 6 with acetic acid, and stored under nitrogen for 3 days at 37° C. The solution was evaporated to drynesss and the residue was triturated with acetone to give the product.

Example 10.—Preparation of 4-azipentanol-1

A solution of 15.4 g. of 4-ketopetanol-1 in 50 ml. of methanol is added carefully to 150 ml. of liquid ammonia and the solution is stirred at reflux temperature for 5½ hrs. The solution is cooled in Dry Ice-acetone and 20 g. of hydroxylamino-O-sulfonic acid in 80 ml. methanol is added over a period of about ½ hr. The colorless mixture is warmed to reflux and stirred for 2 hrs., then allowed to warm to room temperature overnight allowing for the evaporation of excess ammonia. The mixture is filtered, the precipitate is washed with several small portions of methanol, and the filtrate and washings are combined. The resulting solution is evaporated at reduced pressure until no further ammonia remains in the solution (about ⅓ original volume). This solution gives a strong positive test on acidic starch iodide paper. To this solution is added 35 ml. triethylamine, the solution is cooled in ice, stirred rapidly, and a solution of iodine in methanol is added until the red color of iodine persists for several seconds. The resulting solution is evaporated and the residue is distilled to yield the product, B.P. 42° C. at 2.5 mm.

*Example 11.—Preparation of 3-azibutanol-1*

In place of the 4-ketopentanol-1 of Example 10, there is employed an equimolecular quantity of 3-ketobutanol-1 whereby the 3-azibutanol-1 is obtained in equally good yield.

*Example 12.—Preparation of 4-azipentanoic acid*

In the manner described in Example 10, treatment of 4-ketopentanoic acid with liquid ammonia and hydroxylamino-O-sulfonic acid produces the 4-azipentanoic acid.

*Example 1.—Preparation of 3-azibutanoic acid*

To 12.0 ml. of a solution of 26.72 g. of chromic acid in 23 ml. of concentrated sulfuric acid diluted to 100 ml. with water is added 5 drops concentrated sulfuric acid. The solution is cooled to 2° C. and 2.00 g. of 3-azibutanol-1 is added dropwise with stirring. The solution is stirred at 4° C. for 1 hr., then treated dropwise with 20 ml. of 5 N sodium hydroxide solution. The resulting precipitate is filtered off, the filtrate is saturated with salt and extracted with several portions of ether. The aqueous phase is made strongly acidic with hydrochloric acid and the resulting solution is continuously extracted with ether for 5 hr. The ethereal extract is dried over sodium sulfate, and the ether is removed at reduced pressure, leaving an oily residue. Distillation of the residue at 49°–51° C. at 0.16 mm. affords the product.

*Example 14.—Preparation of 4-azi-2-phenylpentanoic acid*

A stirred solution of 20 g. of α-phenyl levulinic acid in 500 ml. of liquid ammonia is stirred at reflux temperature for six hr., cooled to —45° C. and a solution of 20 g. of hydroxylamine-O-sulfonic acid in 100 ml. methanol is added over a period of 1 hr. The mixture is stirred at reflux for 1 hr. and allowed to warm to room temperature overnight allowing excess ammonia to escape. The mixture is filtered, the precipitate is washed with methanol and the filtrate and washings are combined. To this solution is added 20 ml. of 5 N sodium hydroxide and the solution is evaporated at reduced pressure to a volume of about 100 ml. The solution is cooled to —15° C. and acidified to pH<3 using hydrochloric acid. The acidic solution is extracted with several small portions each of methylene chloride and ether. The aqueous solution is made basic with sodium hydroxide and then added dropwise with ice cooling to a well stirred mixture of silver oxide in water (made up by adding with vigorous shaking a solution of 200 ml. of 2 N AgNO₃ to a solution of 200 ml. of 2 N NaOH). The mixture is filtered through Celite®, made strongly acidic with hydrochloric acid an dextracted with several portions of methylene chloride. The organic extracts are combined and dried over sodium sulfate. After removal of the solvent at reduced pressure, the crystalline residue is recrystallized from methanol-water to afford 9.54 g. of 4-azi-2-phenylpentanoic acid, M.P. 73.5°–75° C.

*Example 15.—Preparation of 5-azihexanoic acid*

5-azihexanoic acid is prepared from 5-ketohexanoic acid essentially by the method used for 4-azi-2-phenylpentanoic acid of Example 14. The product is recrystallized from 30°–60° C. petroleum ether; M.P. 14°–16° C.

*Example 16.—Preparation of 4-azi-6-carboxyhexanoic acid*

A solution of 25 g. of 4-ketopimelic acid in 250 ml. of liquid ammonia and 50 ml. of methanol is stirred for 5 hours at reflux, cooled to —40° C. and 5 portions of 4 g. each of hydroxylamine-O-sulfonic acid in 25 ml. methanol are added at 15 minute intervals. The mixture is stirred at reflux for about 1 hour, then allowed to warm to room temperature overnight allowing excess ammonia to evaporate. The mixture is filtered and the precipitate is dried. One-fifth of the crude diaziridine is suspended in 100 ml. of methanol and treated with 6 g. of sodium hydroxide. The mixture is shaken 15 minutes and the solvent is evaporated at 40° C. under reduced pressure to about 35 ml. The residue is added to a stirred mixture of silver oxide in methanol. (The silver oxide is prepared by mixing together 100 ml. of 1 N sodium hydroxide with a solution of 17 g. of silver nitrate in 100 ml. of water, allowing the silver oxide so formed to settle, decanting the supernatant solution and washing the residual silver oxide by decantation with four portions of methanol of about 200 ml. each. The silver oxide is then suspended in 200 ml. of methanol.) The mixture is stirred for 72 hours, filtered through Celite®, the filtrate retreated with a similar quantity of silver oxide at 50° C. for 6 hours, refiltered through Celite®, and the filtrate is evaporated under reduced pressure to about 75 ml. The residual solution is made acid to Congo Red paper with hydrochloric acid and the product crystallizes, M.P. 121°–123° C. The product may be recrystallized from hexane with no change in the melting point.

What is claimed is:

1. A compound selected from the group consisting of those of the formula:

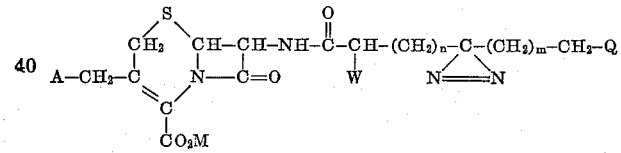

wherein *m* has a value selected from the group consisting of 0, 1 and 2; *n* has a value selected from the group consisting of 0, 1 and 2; A is selected from the group consisting of acetoxy and N-pyridinium; M is selected from the group consisting of hydrogen, pharmaceutically acceptable non-toxic cations and an anionic charge when A is N-pyridinium; Q is selected from the group consisting of hydrogen and carboxy; and W is selected from the group consisting of hydrogen and phenyl with the proviso that when W is phenyl then *n* must not be 0; and the non-toxic pharmaceutically acceptable basic salts thereof when Q is carboxy.

2. A compound according to claim 1 wherein A is acetoxy, M is hydrogen, W is hydrogen, *n* is 1, *m* is 0 and Q is hydrogen.

3. A compound according to claim 1 wherein A is acetoxy, M is hydrogen, W is hydrogen, *n* is 0, *m* is 0 and Q is hydrogen.

4. A compound according to claim 1 wherein A is acetoxy, M is hydrogen, W is hydrogen, *n* is 0, *m* is 1 and Q is hydrogen.

5. A compound according to claim 1 wherein A is acetoxy, M is hydrogen, W is hydrogen, *n* is 2, *m* is 0 and Q is hydrogen.

6. A compound according to claim 1 wherein A is acetoxy, M is hydrogen, W is hydrogen, *n* is 1, *m* is 1 and Q is hydrogen.

7. A compound according to claim 1 wherein A is acetoxy, M is hydrogen, W is phenyl, *n* is 1, *m* is 0 and Q is hydrogen.

8. A compound according to claim 1 wherein A is acetoxy, M is hydrogen, W is hydrogen, $n$ is 1, $m$ is 1 and Q is carboxy.

9. A compound according to claim 1 wherein A is N-pyridinium, M is an anionic charge, W is hydrogen, $n$ is 1, $m$ is 0 and Q is hydrogen.

10. A compound according to claim 1 wherein A is N-pyridinium, M is an anionic charge, W is hydrogen, $n$ is 1, $m$ is 2 and Q is hydrogen.

No references cited.

NICHOLAS S. RIZZO, *Primary Examiner.*